Patented July 22, 1941

2,249,754

UNITED STATES PATENT OFFICE 2,249,754

LOW SUBSTITUTED ALKYL CELLULOSE ETHER

Deane C. Ellsworth, deceased, late of Wilmington, Del., by Joseph F. Haskins, administrator, Wilmington, Del., and Frederick C. Hahn, Upper Montclair, N. J., assignors to E. I. du Pont de Nemours & Company, Wilmington, Del., a corporation of Delaware No Drawing. Application December 21, 1937, Serial No. 180,965

1 Claim. (Cl. 260—231)

This invention relates to new cellulose derivatives and to methods for making and using them. It relates more particularly to alkyl substituted celluloses, especially those alkyl celluloses which are of a low degree of substitution. It especially appertains to such compounds which are of limited solubility in 6% caustic soda solutions at room temperature and relatively soluble in such caustic soda solution at low temperatures, for example, alkyl celluloses of up to 0.6 (particularly up to 0.4) mols of substitution (alkyl residues) per glucose ($C_6$) unit of the cellulose.

Several modifications of alkyl celluloses are known in the prior art. These may be put into three groups:

(a) Ethers soluble in organic solvents.
(b) Ethers soluble in water.
(c) Ethers soluble in alkali.

It has been found that these differ primarily in the amount of substitution that each represents, $a$ being quite high, $b$ lower, and $c$ still lower in alkyl content, and that between each two classes there is considerable room, that is a boundary zone, wherein an ether of a given degree of substitution may be found in either class, depending upon the treatment the cellulose has received either before, during, or after the etherification, i. e., depending upon the degree of degradation of the cellulose molecule. Thus, the second important factor determining solubility of alkyl celluloses and of cellulose compounds generally, in any given solvent, as for example 6% sodium hydroxide solution, is the state of degradation (depolymerization) of the cellulose ether. This second factor is even more important in affecting the usefulness of a cellulose derivative. It is to be understood, however, that neither one of these factors when alone is an absolute determinant of solubility. Derivatives in which the cellulose aggregates are broken down are always of poorer strength and lower elasticity than those that retain to a higher degree the state or extent of polymerization of the native cellulose.

The preparation of certain types of low substituted alkyl ethers of cellulose has previously been mentioned in the literature. In United States of America Patent 1,763,428, Glover and Diamond described the preparation of low substituted ethyl cellulose. In the Journal of the Chemical Society, volume 105, page 2362, volume 103 page 1735, and volume 119 page 77, Denham and Woodhouse described the preparation of a series of methyl celluloses. In British Patents 177,810, 357,167 and 374,964, Lilienfeld described the preparation of low substituted alkyl celluloses. The cellulose ethers whose preparation is described in these publications are apparently of two types, namely, alkali soluble and alkali insoluble.

Lilienfeld proposes the preparation of films, filaments and the like from his alkyl celluloses. In British Patent 357,527 Lilienfeld discloses the preparation of formed bodies from alkali soluble low substituted cellulose ethers by xanthating the same, dissolving the xanthate in caustic alkali, forming the xanthate into the desired physical form, and thereafter regenerating the low substituted alkyl ether in the manner will known in the viscose art. This method would be undesirable in many instances for the utilization of the low substituted alkyl celluloses, because it has all the disadvantages that are attendant upon the regeneration of cellulose from viscose, for example, degradation of the cellulose molecule and the difficulty of removing the sulfur from the final product in addition to the expense and inconvenience of forming the xanthate.

The alkali-soluble low substituted cellulose ethers may be employed in the preparation of such formed bodies by dissolving the low substituted cellulose ether in aqueous caustic alkali solutions, forming the resultant solution into the desired shape, and coagulating in that shape by treatment with acid. Obviously the alkali-insoluble products cannot be handled in such a manner.

It is an object of this invention to prepare new alkyl derivatives of cellulose by reacting cellulose with an alkylating agent, which derivatives retain to a high degree the state of polymerization of the starting cellulose. A further object is to so prepare these derivatives that, while they are not dissolved at room temperature, they are readily dissolved in dilute caustic soda of about 6% concentration by the mechanism of the step of chilling the solution to about 0° to 5° C. or lower (freezing or almost freezing). A still further object is to prepare useful articles from these derivatives such as films, threads, molded articles, sized fabrics, and the like, and to improve the usefulness of some of these articles by applying to them a moisture-proof coating. Still a further object was to devise a process whereby cellulose ethers insoluble in normal or ordinary room temperature aqueous caustic soda could be made into objects having various physical forms without undesirably degrading the cellulose molecule or introducing undesirable chemical entities into the starting or end product. A general advance in the art and other objects which will appear hereinafter are also contemplated.

Briefly, the process of this invention consists of a controlled etherification and degradation of cellulose, in which the cellulose is treated in the presence of a caustic alkali with an etherifying agent in such proportions and under such conditions that there results a new cellulose ether of low degree of substitution, which is insoluble or only imperfectly soluble in dilute aqueous solutions of caustic soda at normal or ordinary room temperature, but soluble in such solutions at low temperatures.

The required solubility is effected by coordinating the degree of substitution and the degree of degradation, usually by adjusting the substitution with regard to the existing degradation or by adjusting the degradation with regard to the existing substitution so that the reaction may be terminated when the product has attained satisfactory solubility characteristics. The new derivatives are readily put into solution through the mechanism of freezing or almost freezing the solution during the preparation thereof, which solution may thereafter (at the desired temperature) be put into the form of useful products and coagulated or the new derivatives precipitated, while in such form.

Preferably the desired etherification and degradation are effected by treating the cellulose with an alkylating agent until a sufficient number of alkyl groups have been introduced and a sufficient degree of degradation has taken place. An especially desirable manner of carrying out the present invention consists in treating the cellulose with caustic alkali solution to form an alkali cellulose, and subjecting that to direct contact with an etherifying agent until a low substituted cellulose ether is formed, both steps being carried out under conditions which do not cause the cellulose to be greatly degraded. A product which retains a high degree of polymerization is thereby produced.

The foregoing objects and related ends are accomplished by the present invention. In the following description and specific exampes are disclosed certain embodiments of the invention as well as details of what is believed to be the best mode for carrying out the invention. The quantities are given in parts by weight throughout the application.

Example I

One hundred (100) parts of wood pulp, containing not over 3% water, and of 86% alpha cellulose content are steeped in 2500 parts of 20% sodium hydroxide solution at a temperature of 25° C. for an hour. The alkali cellulose is pressed to 300 parts by weight, then shredded for 2 hours in a Werner-Pfleiderer type shredder until thoroughly turn to crumbs. The temperature of the shredding is kept below 25° C. by cold water circulating in the shredder jacket. The alkali cellulose is then aged in a loosely covered can for 25 hours at 25°–27° C. This alkali cellulose is then placed in a mixing machine of the Werner-Pfleiderer type and an etheral solution of dimethyl sulfate is added slowly so that no local overheating occurs. This solution is made up by dissolving 20 parts of dimethyl sulfate in 250 parts of ethyl ether. During the addition of the reagent, cold water is circulated through the shredder jacket. When the solution has all been added, the cover is fastened in place and the reaction is allowed to follow its course during eighteen hours, while kneading is maintained and the jacket water temperature is held at 27° C.

The white crumbly product is removed from the mixer, practically indistinguishable in appearance from the initial alkali cellulose. Analysis of the purified product showed a methoxyl content of 4.31%, equivalent to about 0.23 groups for each glucose unit of the cellulose. This reaction produce is dispersed in 1700 parts of 6% sodium hydroxide solution to make a solution of 5% concentration based on the weight of the pulp used. Since it does not make a perfect solution at room temperature, it is necessary to cool by means of brine jacketed equipment or other refrigeration device until a temperature of $-8°$ to $-12°$ C. is reached. At this temperature the mass is very thick and pasty with crystals distributed throughout. It may become impossible to continue stirring the solution, in which case the mass quickly congeals. After a low temperature of $-10°$ C. has been reached, it is not necessary to hold the mass at that temperature for any length of time; instead the solution is brought back to room temperature, with stirring renewed as soon as practicable. The solution will now be found to be smooth, essentially fiber-free, clear, colorless or a pale straw color, depending on the purity of the wood pulp used and the amount of bleaching it had received. It is now filtered through a filter press or centrifuged to remove any last fibers or extraneous matter to insure clear and perfect films. The solution, after freezing as described, is stable at room temperature for at least two weeks provided it is protected from the action of carbon dioxide of the air. It is placed under vacuum in order to remove entrapped air if it is to be used immediately for preparation of films or filaments but simply allowing the solution to stand will insure bubble-free products after a time.

Example II

For the preparation of transparent sheets the solution prepared as described in Example I is spread out on a glass plate to a depth of about $3/100$ inch, and the glass plate immersed in a bath containing 10% sulfuric acid and 15% sodium sulfate. The film coagulates very rapidly and, after a few minutes, is removed from the plate, washed with water, dipped for about ½ minute in a 4% glycerin bath and spread again on the glass plate. It is now dried for 30 minutes at 60° C. After allowing the plate with the film on it to come back to room temperature and to humidify for about an hour it may be stripped from the plate. The sheet so secured is tough, flexible and elastic. It has a dry strength about that of regenerated cellulose films, and the dry film is softer and more flexible than films of regenerated cellulose.

Example III

The films prepared as described in Examples I and II are coated with a composition comprising a synthetic resin and a wax, preferably with the addition of a plasticizer. This can be accomplished according to the teachings of French Patent No. 718,440, by using for example:

| | Parts by weight |
|---|---|
| Polymerization products resulting from 60% vinyl chloride and 40% vinyl acetate | 15 |
| Tricresyl phosphate | 7 |
| Refined paraffin | 3 |

These components are dissolved in 100 to 200 parts of toluene and the film is coated in any suitable manner such as by immersion. After the excess coating has been removed the solvents are evaporated at an elevated temperature, whereupon a film is produced having at least the same transparency and flexibility of the original base sheet but having in addition the ability to resist penetration of moisture or water vapors.

Example IV

Textile materials, such as cotton cloth, are dipped into the solution prepared as in Example I, then into a bath of 10% sulfuric acid. After a few minutes in this bath the cloth is removed, washed acid-free and dried.

Example V

Eighty-one (81) parts oven-dried cellulose in sheet form are steeped in 20% sodium hydroxide solution at room temperature for one hour and then pressed to a weight of 243 parts. The sheets are comminuted in a shredder during 2 to 3 hours until uniform fine crumbs are obtained. The alkali cellulose so obtained is allowed to ripen for 20 hours at 30° C., then put back into the shredder, with cold water circulating through the cooling jacket surrounding the shredding chamber, while a solution of 38 parts of dimethyl sulfate in 200 parts of diethyl ether is added slowly so that the heat of reaction will at no time cause local overheating. The reaction is then allowed to take place at 30° C. for 20 hours. The product is not visually distinguishable from the alkali cellulose used.

This product is dispersed, without isolation, in enough 6% sodium hydroxide to make a 5% solution, calculated on the basis of the original cellulose. The mixture is then cooled to —5° to —10° C. The clarity becomes at once much enhanced and the solution can be readily filtered, either cold or after raising to room temperature, leaving practically no residue. The filtered solution is clear, faintly straw colored and stable at 30°–35° C. for 2½ weeks or more. This solution can be made into sheets or threads as in Examples II or III, and is especially suitable for impregnating cloth or sizing paper.

Instead of dissolving the reaction product immediately, it may be plunged into water containing enough acid to neutralize the caustic or into enough water to dilute the caustic below 1% strength. The precipitate is then washed free from salts or alkali and dried at 65°–100° C. The product is a white, fibrous material, completely soluble in 5 to 10% sodium hydroxide at or below 0° C. Analysis of this product by the Zeisel method showed a methoxyl content of 7.98% equivalent to 0.43 methyl groups for each glucose unit of the cellulose.

Example VI

Two hundred and forty (240) parts of alkali cellulose prepared as in Example V are allowed to age for 24 hours at 25° C., then put into a mixing machine with 60–70 parts of diethyl sulfate and the mixture is thoroughly kneaded during a reaction time for 24 hours. The temperature is maintained at 35°–40° C. by circulating water at this temperature in the jacket of the mixer. The white product, which has the appearance of unchanged alkali cellulose, is put to disperse in 1300 grams of 6% caustic in which it does not dissolve at room temperature, or dissolves only partially, to make a mushy, fibrous slurry of swollen fibers. This is cooled to the freezing point (—12° C.) or just above it to form an excellent, viscous but clear and transparent solution suitable for use in forming films, threads, etc.

Example VII

One mol (162 grams) of oven-dry wood cellulose is steeped in 19% sodium hydroxide solution at room temperature for an hour, pressed to a weight of 486 grams and shredded for 2 hours in the standard manner. This alkali cellulose is allowed to age at room temperature (25° C.) for 24 hours, and then placed in an autoclave provided with a stirrer and external heating device. Methyl chloride is forced in until ¼ mol (12.5 grams) are introduced. The autoclave is sealed off and heated, with stirring, to a temperature of 85°–90° C., at which temperature it is held for 3½ hours. After cooling, the product is removed and dispersed in 2400 cc. of 6% sodium hydroxide solution. At room temperature there results partial solution containing incompletely soluble fibers. After freezing (—12° C.), the solution filters very well, and is suitable for the preparation of films or filaments as described in Examples II and III or for sizing paper or treating textiles.

Example VIII

One hundred sixty (160) parts of air dry wood cellulose containing about 6% moisture was steeped for one hour in 2000 parts of 18% sodium hydroxide at 25° C. The material was then pressed to a weight of 400 parts and was shredded for ½ hour at 20° C. in a Werner-Pfleiderer shredder. Sixty-three parts of dimethyl sulfate were then sprayed into the mass. After another hour of shredding, the reaction mixture was allowed to age for 25 hours at 25° C. The product was purified by washing with water until caustic-free. The yield was equal to the alpha cellulose of the starting pulp.

Upon testing the product was found to be insoluble in 7% sodium hydroxide at 20° C. but dissolved therein readily upon cooling below 0° C. It gave a viscous clear solution.

Example IX

A beater charge of a bleached sulfite pulp was beaten to bond paper pulp slowness. The beaten pulp was sized with methyl cellulose of Example VIII by adding 100 parts of a 1% solution of methyl cellulose in 6% NaOH to every 100 parts of fiber in the beater, followed by the addition of alum until the pH of the pulp water was reduced to 6.6. The beater charge was kept in motion during this sizing operation, and for sufficient time thereafter to obtain uniform distribution of the size. The beater charge was then dropped, diluted to paper making consistency, and formed into sheets on a hand operated sheet mold. The sheets were couched from the mold, pressed between felts, and dried at about 100° C.

The sheets thus treated with methyl cellulose were characterized by greatly improved wet and dry strength, high lint resistance, when wet, and rapid absorption of water, as compared with the unsized material.

Example X

One portion of the solution prepared as described in Example VIII was cast into films by flowing on a glass plate and immersing in a precipitating bath. The film was coagulated rapidly and did not shrink during the coagulation operation. It was washed in running water, steeped in 3% glycerin for 15 minutes and then dried. It gave a flexible transparent film. The film after drying for 20 hours at 65° C. could not be dissolved in 10% sodium hydroxide at 25° C. by stirring by hand in a beaker. While it was easily disintegrated under these conditions, it did not dissolve. Grains of the material could easily be detected by tilting the beaker and allowing suspended material to cling to the side of the beaker.

Example XI

The solution is made up as in Example I. This solution is forced through a small orifice about .004 inch in diameter, into a coagulating bath consisting of 10% sulfuric acid and 15% sodium sulfate; the thread so formed, which may, if desired, be made up of combined filaments from several such orifices, is passed over guides in such a way that tension is applied to the thread while it is in the gelled state, and collected on a bobbin. It is subsequently washed free from acid, bleached, if desired, and dried.

Example XII

The films prepared according to the procedure set out in Example II were coated by immersing in the composition given below, which is disclosed in Canadian Patent No. 359,728. The solution consisting of:

| | Parts |
|---|---|
| Candelilla wax | 33 |
| Paraffin (melting point 62° C.) | 16 |
| Zinc resinate | 5 |
| Toluene | 500 to 1000 | may be applied in any other convenient manner. After coating the excess of the coating composition was removed and the solvent evaporated at an elevated temperature. The resulting coated film is glass-clear in transparency, flexible, and distinctly water-proof.

As starting materials for the preparation of such low substituted alkyl celluloses there may be used any of the purified celluloses commonly used in the art such as cellulose in the form of cotton linters, or wood pulp, in which the state of molecular aggregation is high as evidenced by high or medium viscosities and high alpha cellulose content, for example, more than 15 seconds viscosity in the standard cuprammonium test and more than 85% alpha cellulose content. The cellulose is preferably dry but need not be bone dry. Air dried cellulose would ordinarily be used.

It has been found that in order to obtain these new derivatives of suitable solubility in dilute caustic soda solution, it is essential to coordinate two factors, namely, the degree of substitution of alkyl residue, and the degree of degradation of the cellulose. Thus, in preparing these new derivatives, cellulose is subjected to a combined etherification and degradation process, the etherification and degradation being continued until a cellulose ether is formed which, for the most part, is insoluble in dilute aqueous caustic soda solutions at normal room temperatures but which dissolves therein upon cooling to about 0° or lower.

To obtain solubility suitable to permit desirable concentration and viscosity in the spinning solution, for example, some degradation of the cellulose during the preparation of the alkali cellulose, or after the reaction, is desirable but the treatment in this operation should not be more drastic than is necessary. It is not possible to specify absolute limits of degree of degradation or of substitution since it is possible to obtain products of the desired solubility by using products of higher degrees of substitution and lower degrees of degradation or vice versa by using products of higher degrees of degradation and lower degrees of substitution. In some cases the degradation effected by the alkali cellulose process may be so slight as to leave the cellulose in a substantially undegraded condition. In these instances the ageing should not be allowed to proceed to a point where the degradation has gone beyond the degree of degradation which occurs when the alkali cellulose is prepared from purified cotton linters and aged for 48 hours at 20° to 25° C.

In the preferred form of the invention the cellulose is steeped in an 18%–20% solution of caustic alkali at room temperature or below and the excess solution is pressed out to leave a moist alkali cellulose which is then shredded to a state of fine crumbs as known in the viscose industry. Ethers of best solubility are obtained using steeping caustic concentrations of mercerizing strength, i. e., 15%–25%, although caustic as concentrated as 30% or 35% gives useful products. As the steeping caustic concentration is extended above or below these concentrations, the solubility of the finished product gradually becomes poorer and poorer until above 40% caustic soda or below 10% the products obtained may be considered to be of unsatisfactory solubility. Preferably the shredding is carried out at not more than 25° C. and for as short a time as feasible.

The degree of substitution is controlled by limiting the proportion of the etherification agent used to a range of from about $\frac{1}{16}$ or $\frac{1}{8}$ mol to about 1 mol per $C_6$ unit of cellulose and by terminating the reaction promptly when the desired degree of substitution has been effected. The etherification reagent may be any one of the lower alkylating agents, i. e., a methylating or an ethylating agent, preferably dimethyl sulfate. The etherification reaction may be carried out at room or lower temperatures with this reagent. Higher temperatures are necessary for less active etherifying agents such as methyl and ethyl chloride. It may be added either as such or in the form of a one normal solution or any other desirable variation. To insure that the desired end point is not past, an end point test has been devised and is described later in this specification. As stated above, the amount of agent to be combined with the cellulose depends on the product desired and the treatment to which the cellulose has already been subjected, and further it depends upon the nature of the reagent, thus dimethyl sulfate is more reactive than diethyl sulfate or methyl chloride. In balancing the two controlling factors within the limits of this invention it has been found to be preferable to secure the desired solubility by a slightly greater degree of substitution while keeping the degradation of the cellulose low since this method leads to products which give films, threads, etc., of higher strength and elasticity.

The proper stage of etherification at which to terminate the reaction may be determined by removing samples of the reaction mixture from time to time, and placing them in dilute caustic soda solution and cooling to freezing. If a few drops of the solution, warmed again to room temperature, are then placed between glass plates and the plates pressed or rubbed against each other, a good product will remain clear, while insoluble fibers will be easily seen in an incompletely reacted product.

Ageing of the alkali cellulose should be for as short a time as possible (consistent with the quality of the product desired). The amount of ageing required varies with the nature of the cellulose used, with the amount of etherifying agent to be used and with the purpose for which the solution of the derivative is intended. This ageing of the alkali cellulose may sometimes be eliminated but in case of a very resistant cellulose, or in cases where an alkyl cellulose solution of high concentration and moderate viscosity is desired, more or less ageing is unavoidable. In general, in order to produce useful alkyl celluloses which will dissolve in dilute alkalies only on cooling to 0° C., or lower, and which are suitable for the production of film and filaments of high quality, satisfactory products can be obtained when the alkali cellulose ageing does not exceed 24 hours at 28° C. or 48 hours at 20° C.

Ageing to reduce viscosity or degrade the cellulose may be effected either before or after the etherification. The procedure is simplified somewhat when the etherification is carried out before the ageing step and the products appear to be of somewhat better solubility when prepared in this way. When the reaction is effected in a shredder, the etherifying agent may be added before the alkali cellulose is completely shredded. Although it is preferred to effect degradation by ageing (for instance, as in alkali cellulose manufacture), the viscosity of the material may be reduced by other means such as treatment of the starting cellulose or etherified cellulose with agents which reduce the degree of polymerization of the cellulose such as dilute acids or oxidizing agents.

In the preparation of solutions of the product the etherification product is mixed with a dilute sodium hydroxide solution and cooled to a point necessary to give solubility of the desired degree. Optimum solubility is obtained with caustic soda concentrations of 9%–10% but for reasons of economy and commercial practicability, it is usually preferred to use solutions of 5%–8% concentration of sodium hydroxide. Preferred concentrations of cellulose alkyl ether may vary from 4% to 9% for the preparation of films and filaments or may be of even lower concentration for other uses. For example, in the beater sizing of paper very low concentrations are of greatest advantage for precipitation of methyl cellulose in a finely divided form whereas higher concentrations give stringy, curdy precipitates which cannot be readily mixed with the pulp of the beater.

The alkyl celluloses of this invention give best solutions if purified. This is usually accomplished by washing with water. Where the quantity of caustic remaining in the reaction mixture is high or the product may be unusually soluble, it may be desirable to wash first in warm water or to use acidified water. The product is much more easily purified if acidified because the product tends to retain acid much less tenaciously than it does sodium hydroxide. For many purposes, it is unnecessary to isolate the product and this procedure is preferred wherever possible. When the material is to be used at a distance from its point of preparation or at a considerably later time, purification is necessary since ageing continues so long as alkali is present and an undesirable degree of degradation might take place. It is possible, of course, to stabilize an alkali cellulose mixture of this type by displacement of oxygen with nitrogen, but this is expensive and is hardly practicable on a commercial scale.

When it is desirable to isolate the alkyl cellulose, the product obtained by the etherification may be washed out with a large excess of water, keeping the sodium hydroxide content of the washing below 1%, and then dried, but such products have a tendency to dry to a horny condition difficult to dissolve. This difficulty may be overcome to some extent by washing with methanol and then with ether and/or benzene before drying. But it is, in general, unnecessary to isolate this product, since for spinning it is possible to dissolve the etherification product directly in dilute alkali, adjusting the concentration to the desired viscosity.

In the preparation of certain of the useful articles mentioned above, the etherification product containing approximately 0.06 to 0.60 (certain intermediate and narrower ranges, for example, 0.06 to 0.4, 0.1 to 0.35, 0.23 to 0.60 and 0.23 to 0.35 mols of substitution warrant special mention) alkyl residues per glucose unit is mixed with about 16 times its weight of a 6%–10% sodium hydroxide solution and cooled below 0° C. or to the solubility point. In many cases lower concentrations of caustic, e. g., 4%, may be used with advantage, especially where the solution is to be used for purposes other than spinning, for example, for sizing, impregnating, etc.

In preparing the solution, temperatures from 5° down to the freezing point are satisfactory. The temperature to which the mixture must be cooled to effect solution is to some extent dependent upon the degree of substitution of the derivatives. The lower the degree of substitution with a given degree of degradation, the lower the temperature required to effect the best dispersion. The solution so obtained may be brought back to room temperature and filtered if desired. It may be used directly for the treatment of textiles or paper, or it may be put into the desired form and coagulated by suitable baths. While the solutions described are not stable under all conditions, they may be kept as long as three weeks or more at room temperature without gelling. High temperatures accelerate the gelling but after gelling has taken place, the material may be liquefied again by chilling. The phenomenon of gelling in general is limited to those products of borderline solubility even upon chilling or to unpurified products. Purified products of best degrees of solubility are indefinitely stable at 25° C.

In the process used to form fibers or threads, considerable variation is possible in the composition of the coagulating bath. Water may in some cases be used but is usually not satisfactory. Solutions of mineral acids such as sulfuric, ranging from low concentrations such as 3% or 4% to 70% or higher are suitable. These may be with benefit combined with salt solutions, as 5% to 20% sodium sulfate or ammonium sulfate and also with buffers and sugars such as is common practice in the viscose industry. The problem is thus very similar to that of viscose, but is not complicated by the necessity for regeneration and contamination (if any) is only with the salt and water of the solution. Absence of sulfur compounds also diminishes the need for bleaching. An important property of the regenerated products is that they contain no sulfur. Comparable viscose products always contain sulfur which it is very difficult to remove without destruction of the regenerated cellulose itself.

The process described in Example II for preparing transparent sheets is one suited to laboratory technique. Instead of coagulating the film on the glass plate, the solution may be forced continuously through a narrow slit into a coagulation bath and thereafter passed over rolls through suitable baths, etc., in the manner known to the viscose industry. In this case and more particularly in Example XI which concerns the formation of threads and is not adapted to laboratory technique, continuous mechanical processes have not been described since the invention is not concerned with these and since they are well known in the art.

In the preparation of transparent sheets by the process of this invention, the sheets may be softened by any of the softening materials which are applicable to the softening of regenerated cellulose, for example, glycerin, di-ethylene glycol and the like. In general, the softener may be applied from a bath of lower concentration than is used in the preparation of viscose films because the films are more highly swollen and accordingly take up more of the softening liquid. The amount of softener required is somewhat less than that required for regenerated cellulose films and the unsoftened film is more flexible than an unsoftened regenerated cellulose film.

It has also been found that the transparent sheets mentioned above may be rendered moistureproof. In addition to the methods described in Examples III and XII, they may be treated according to the processes described in United States of America Patent 1,737,187 for the moistureproofing of sheets of regenerated cellulose. A satisfactory composition for this purpose contains 43 parts cellulose nitrate, 23 parts tricresyl phosphate, 7 parts paraffin wax, 27 parts gum damar, and 760 parts of a mixed solvent containing about 3 parts ethyl acetate to 2 parts toluene. After passing sheets of alkyl cellulose made as in Example II through the above composition, the excess lacquer was removed from the sheet by means of a squeeze roll and the sheets were dried at a temperature substantially above the melting point of the wax. The moistureproof sheets were glass clear, flexible, and were highly impermeable to the passage of moisture vapor, comparing very favorably in this respect with films of regenerated cellulose which had been moistureproofed by the same composition. However, when the adhesion of the moistureproof coating was tested by suspension in water, it was found to be many times that of the adhesion of the similar coating on a sheet of regenerated cellulose.

The coagulation or regeneration process of this invention and the products thereof exhibit a number of outstanding and surprising characteristics. Among these may be mentioned great gel strength, low shrinkage, rapid coagulation, greater film thickness than films from viscose, high film deformation resistance, great adherence to moistureproof lacquer films, and great affinity for dyes.

Precipitation of the cellulose ethers of this invention in regenerating baths characteristic of those of the viscose art leads to gel (regenerated but not dried) films of very great strength. This is a surprising result. The regeneration of films from solutions of cellulose ethers which are of higher degrees of substitution and which are soluble in alkali at room temperature leads to films of such low gel strength that they can be handled only with great difficulty in this form. On the other hand regeneration of caustic solutions of unetherified cellulose leads to regenerated products which are of extremely poor wet strength in the gel form. It is surprising indeed that a product would be found of intermediate degree of substitution which would exhibit a so much greater strength in gel form. The improved gel strength is of exceedingly great importance in the practical utilization of these materials. For example, in casting of films on machines of the type now used in the preparation of viscose films a minimum gel strength is necessary for successful film formation. This is necessary since the film must pass through certain distances in unsupported form. It must also pass between rolls which squeeze out surplus liquid. The films in gel form must possess at least sufficient strength to support themselves in passing over these unsupported distances without breaking due to their own weight and to pass through squeeze rolls without being damaged. The gel strength of the cellulose ethers of the prior art has been of such a low degree that machine casting has not been feasible. The gel strength of the products of this invention especially those where degree of degradation has been minimized, is sufficiently high that machine casting can be effected. This means that the products of this invention can be utilized commercially for the preparation of transparent sheeting whereas those of the prior art cannot.

The products of this invention are characterized by great wet strength after regeneration and drying. The alkyl celluloses of the prior art have been of low wet strength in the regenerated form. This is of special importance in the sizing of textiles. For example, the textiles sized with the alkyl celluloses of this invention are laundry-fast, i. e., they are not removed to an excessive degree from the fabric by laundering as is starch. On the other hand, the alkyl celluloses of the prior art are so completely removed from the fabric by several washings that they cannot be considered laundry-fast.

The products of the invention are regenerated from their solutions with scarcely any shrinkage. This is of exceedingly great importance in the preparation of transparent sheeting. Viscose when cast into films shrinks to a considerable degree, the product coming off of a casting machine being about one-half the width of the film as it entered the regenerating bath. On the other hand, the products of this invention give films which are about 35% wider than viscose films. This is a surprising and unexpected result which is of great practical importance because it means that three casting machines can be used for making the same quantity of film as can be made with four machines using viscose.

Solutions of the alkyl celluloses of this invention are coagulated with extremely great rapidity. The rate of coagulation is considerably greater than with viscose. This means that films and filaments of the alkyl celluloses of this invention can be prepared at much higher speeds than viscose films can be prepared (with corresponding savings in cost). Surprisingly, films of the products can also be formed of great thickness. Using viscose, it is not possible to prepare thick films, it being necessary to make thick films by laminating together several layers. This appears to be an inherent difference between viscose and the materials of this invention.

The products of the invention in regenerated form show a surprising resistance to deformation upon being subjected to changes in humidity. This is illustrated in the accompanying table.

Table I

| Type film | Deformation |
|---|---|
| Viscose | Percent 5 to 8 |
| Methyl cellulose (low substituted) | 2.5 |

The products of the invention show a great affinity for moistureproofing lacquer in the presence of water. The poor affinity of cellulose films for moistureproofing lacquer in the presence of water is a serious defect and has prevented exploitation of these materials for many uses where liquid water is present. The regenerated products of this invention exhibit an enhanced affinity for moistureproofing lacquer in the presence of water (liquid). This is illustrated in the accompanying table.

Table II

| Type film | Time of anchorage for moistureproofing lacquer in the presence of water |
|---|---|
| Viscose ............... hours.. | 2 |
| Ethyl cellulose (low substituted) ....... days.. | 20 |

The regenerated products of this invention exhibit an enhanced affinity for direct dyes. For example, their affinity for a direct dye such as Pontamine Sky Blue 6 BX is as much as ten times as great as that exhibited by viscose filaments. This unique property is of special application in the obtaining of cross-dyed effects.

These new low substituted products differ from those of the prior art in that they are insoluble or at least imperfectly soluble in dilute aqueous caustic soda at normal temperatures but become soluble in such alkali solutions after being chilled to near the freezing point of the solution. In other words, the ethers as prepared are undissolved by 6% caustic soda at ordinary room temperatures but are dissolved therein after cooling to about 5° to −10° C.

In general, the regenerated products from the solutions of the products of the invention, like the purified fibrous ethers before solution, are soluble in dilute aqueous alkalies after chilling but are not dissolved by such alkalies at room temperature without chilling. Usually the regenerated products are more easily dissolved than the parent fibrous alkyl cellulose ether. This tendency for the regenerated products to be more soluble than the starting material results in some of the more soluble alkyl celluloses after regeneration being soluble in dilute caustic soda at room temperature. However, it has been found that if the regenerated product is dried at 65° C. for 24 hours the product cannot be dissolved at normal room temperature in dilute caustic soda by agitation such as is obtained by stirring with a stirring rod by hand (which agitation is sufficient to dissolve the product upon cooling).

The caustic soda (alkali) solution and coagulation process of this invention has the advantage over the viscose-like process mentioned in the first part of the specification in that it sets up films faster during the coagulation step.

This specification contains subject matter also found in our U. S. A. Patent No. 2,157,530 issued May 9, 1939, filed July 22, 1933.

As many apparently widely different embodiments of this invention may be made without departing from the spirit and scope thereof, it is to be understood that we do not limit ourselves to the specific embodiments thereof except as defined in the appended claim.

We claim:

A low substituted alkyl cellulose having 0.1 lower alkyl residues per $C_6$ unit of cellulose, the alkyl residues of which contain from one to two carbon atoms, said alkyl cellulose being substantially undissolvable by 6% aqueous caustic soda at ordinary temperature but soluble in said alkali solution near the freezing point thereof.

FREDERICK C. HAHN.
JOSEPH F. HASKINS,
Administrator of the Estate of Deane C. Ellsworth, Deceased.